United States Patent
Kuronuma (12)

(10) Patent No.: US 10,165,146 B2
(45) Date of Patent: Dec. 25, 2018

(54) PRINTER CONTROL USING SCANNER DISPOSED AHEAD OF PRINT HEAD TO DETECT FRAME ON PRINT MATERIAL BASED ON PRINTER MOVEMENT AMOUNT AND ACQUIRED IMAGE BEFORE PRINTING

(71) Applicant: CASIO COMPUTER CO., LTD., Shibuya-ku, Tokyo (JP)

(72) Inventor: Hirotaka Kuronuma, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/677,634

(22) Filed: Aug. 15, 2017

(65) Prior Publication Data

US 2018/0088881 A1 Mar. 29, 2018

(30) Foreign Application Priority Data

Sep. 27, 2016 (JP) ................................. 2016-187702

(51) Int. Cl.
*H04N 1/107* (2006.01)
*H04N 1/393* (2006.01)
(Continued)

(52) U.S. Cl.
CPC ................ *H04N 1/107* (2013.01); *B41J 3/36* (2013.01); *B41J 11/008* (2013.01);
(Continued)

(58) Field of Classification Search
CPC ............. H04N 1/00708; H04N 1/0071; H04N 1/00713; H04N 1/00734; H04N 1/00737; H04N 1/00761; H04N 1/00763; H04N 1/00774; H04N 1/00779; H04N 1/107; H04N 1/1072; H04N 1/393; G06K 15/1843; G06K 15/1868; B41J 3/36; B41J 11/008
See application file for complete search history.

(56) References Cited

U.S. PATENT DOCUMENTS 6,038,032 A * 3/2000 Kokubo ..................... B41J 3/36
358/1.12
6,305,856 B1 * 10/2001 Miyazaki ............... B41J 11/008
400/120.01
(Continued)

FOREIGN PATENT DOCUMENTS

JP 05330150 A 12/1993
JP 2018052099 A * 4/2018

*Primary Examiner* — Scott A Rogers
(74) *Attorney, Agent, or Firm* — Holtz, Holtz & Volek PC

(57) ABSTRACT

A printer includes: a processor; a head configured to perform printing; a sensor configured to detect an amount of movement of the printer; and a scanner configured to acquire an image including a frame described on a material to be printed beforehand, the scanner being disposed forward of the head in a moving direction of the printer. The processor executes during scanning for frame detection over the material to be printed, frame detection processing to detect the frame based on the amount of movement and the image without performing the printing, and during scanning for printing over the material to be printed, print processing to perform the printing with the head based on the frame detected.

9 Claims, 6 Drawing Sheets

(51) Int. Cl.
*H04N 1/00* (2006.01)
*G06K 15/02* (2006.01)
*B41J 3/36* (2006.01)
*B41J 11/00* (2006.01)

(52) U.S. Cl.
CPC ..... *G06K 15/1843* (2013.01); *G06K 15/1868* (2013.01); *H04N 1/00708* (2013.01); *H04N 1/00737* (2013.01); *H04N 1/00761* (2013.01); *H04N 1/00774* (2013.01); *H04N 1/393* (2013.01)

(56) References Cited

U.S. PATENT DOCUMENTS

| | | | | |
|---|---|---|---|---|
| 6,386,671 B1* | 5/2002 | Huston | ............... | B41J 3/01 235/462.08 |
| 6,543,874 B2* | 4/2003 | Matsumoto | ............... | B41J 3/28 347/14 |
| 6,674,543 B2* | 1/2004 | Day | ............... | B41J 3/36 358/1.8 |
| 8,096,713 B1* | 1/2012 | Bledsoe | ............... | B41J 3/36 347/109 |
| 8,210,758 B2* | 7/2012 | Gates | ............... | B41J 3/36 400/87 |
| 2006/0203028 A1* | 9/2006 | Agarwal | ............... | B41J 29/393 347/19 |
| 2008/0075511 A1* | 3/2008 | Reed | ............... | B41J 3/36 400/88 |
| 2017/0274644 A1* | 9/2017 | Shinohara | ............ | B41J 2/04586 |
| 2018/0086120 A1* | 3/2018 | Kuronuma | ............... | B41J 19/14 |

* cited by examiner

MAIN SCANNING DIRECTION

MAIN SCANNING DIRECTION

| RATIO OF HORIZONTAL SIZE TO VERTICAL SIZE OF DETECTED FRAME | LAYOUT PATTERN TO BE SET |
|---|---|
| 1:5 OR MORE | FULL TEXT UNIT |
| 1:2 OR MORE TO LESS THAN 1:5 | CHARACTER STRING UNIT |
| LESS THAN 1:2 | ONE LETTER UNIT |

FIG. 4A
「ABC DEF」
INPUT DATA
FIG. 4B
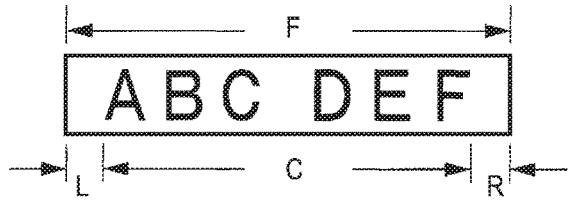
LETTERS ARRANGED IN FULL-TEXT UNIT LAYOUT
FIG. 4C
LETTERS ARRANGED IN CHARACTER-STRING UNIT LAYOUT 1
FIG. 4D
LETTERS ARRANGED IN CHARACTER-STRING UNIT LAYOUT 2
FIG. 4E
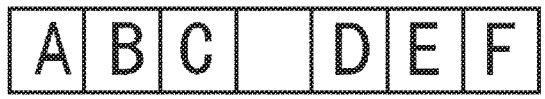
LETTERS ARRANGED IN ONE-LETTER UNIT LAYOUT 1
FIG. 4F
LETTERS ARRANGED IN ONE-LETTER UNIT LAYOUT 2
FIG. 4G
LETTERS ARRANGED IN ONE-LETTER UNIT LAYOUT 3

BEFORE SIZE ADJUSTMENT

AFTER SIZE ADJUSTMENT

BOXES ARE CONNECTED

FRAMES ARE SEPARATED

FIG. 8

| サ | サ | キ | | コ | ウ | タ | ロ | ウ | | | | | |

| 佐々木 | 光太郎 |

東京都　△△区○○1-2-3

PRINTER CONTROL USING SCANNER DISPOSED AHEAD OF PRINT HEAD TO DETECT FRAME ON PRINT MATERIAL BASED ON PRINTER MOVEMENT AMOUNT AND ACQUIRED IMAGE BEFORE PRINTING

BACKGROUND OF THE INVENTION

1. Field of the Invention

The present invention relates to a printer, a method for controlling a printer, and a recording medium.

2. Description of the Related Art

A printer is disclosed, with which a user prints data on a sheet by holding the printer with a hand and moving a print part of the printer while bringing it in contact with the sheet. The printer is configured to divide data of a document of one page into n parts, and print the data of each part with auxiliary lines. For instance, Patent Document JP H5-330150A discloses a printer of this type.

Some of materials to be printed have a frame printed beforehand, in which data such as a name is to be filled in, and a printer is required to print such data in the frame.

The printer described in the above Patent Document, however, is to print data of a plurality of lines so that the spaces between the lines can be substantially equal, and this printer is not configured to print the data in a frame.

SUMMARY OF THE INVENTION

In view of this circumstance, the present invention aims to provide a printer, with which a user prints data, such as a name, on a material to be printed while moving the printer manually in a main scanning direction. The printer is capable of correctly printing the data in a frame printed beforehand on the material to be printed.

According to an embodiment of the present invention, a printer includes: a processor; a head configured to perform printing; a sensor configured to detect an amount of movement of the printer; and a scanner configured to acquire an image including a frame described on a material to be printed beforehand, the scanner being disposed forward of the head in a moving direction of the printer. The processor executes during scanning for frame detection over the material to be printed, frame detection processing to detect the frame based on the amount of movement and the image without performing the printing, and during scanning for printing over the material to be printed, print processing to perform the printing with the head based on the frame detected.

According to an embodiment of the present invention, a method for controlling a printer, the printer including: a head configured to perform printing; a sensor configured to detect an amount of movement of the printer in a direction along which the printer moves; and a scanner configured to acquire an image including a frame described on a material to be printed beforehand, the scanner being disposed forward of the head in the moving direction of the printer, includes: a frame detection step of, during scanning for frame detection over the material to be printed, detecting the frame based on the amount of movement detected by the sensor and the image acquired by the scanner without performing the printing, and a print step of, during scanning for printing over the material to be printed, performing the printing with the head in accordance with the detected frame.

According to an embodiment of the present invention, a recording medium having stored thereon a program for a printer including: a processor; a head configured to perform printing; a sensor configured to detect an amount of movement of the printer in a direction along which the printer moves; and a scanner configured to acquire an image including a frame described on a material to be printed beforehand, the scanner being disposed forward of the head in the moving direction of the printer, the program making the processor execute at least the steps of: a frame detection step of, during scanning for frame detection over the material to be printed, detecting the frame based on the amount of movement detected by the sensor and the image acquired by the scanner without performing the printing, and a print step of, during scanning for printing over the material to be printed, performing the printing with the head in accordance with the detected frame.

BRIEF DESCRIPTION OF THE SEVERAL VIEWS OF THE DRAWING

FIG. 1A is a cross-sectional view of the printer, and FIG. 1B is a bottom view of the printer.

FIGS. 4A-4G illustrate input data and the arrangement of the input data in each layout.

FIG. 8 illustrates an example of the result of printing in one embodiment of the present invention.

DETAILED DESCRIPTION OF THE INVENTION

Figure 1A:
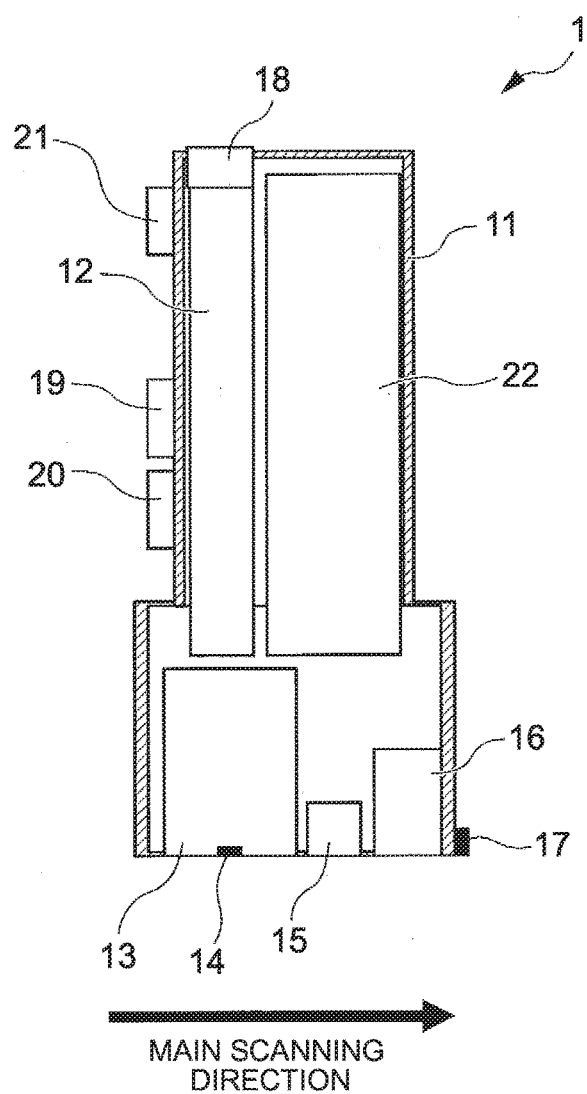
FIGS. 1A and 1B show the configuration of a printer according to one embodiment of the present invention.

The following describes embodiments of the present invention in details, with reference to the attached drawings. Like reference numerals indicate like parts throughout the description of the embodiment.

[Configuration of Printer]

Figure 1B:
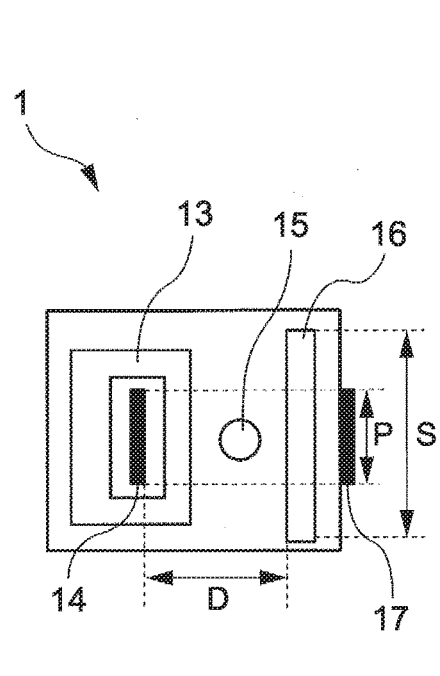

FIGS. 1A and 1B show the configuration of a printer 1 according to one embodiment of the present invention. FIG. 1A is a cross-sectional view of the printer 1, and FIG. 1B is a bottom view of the printer 1.

Figures 2, 3:
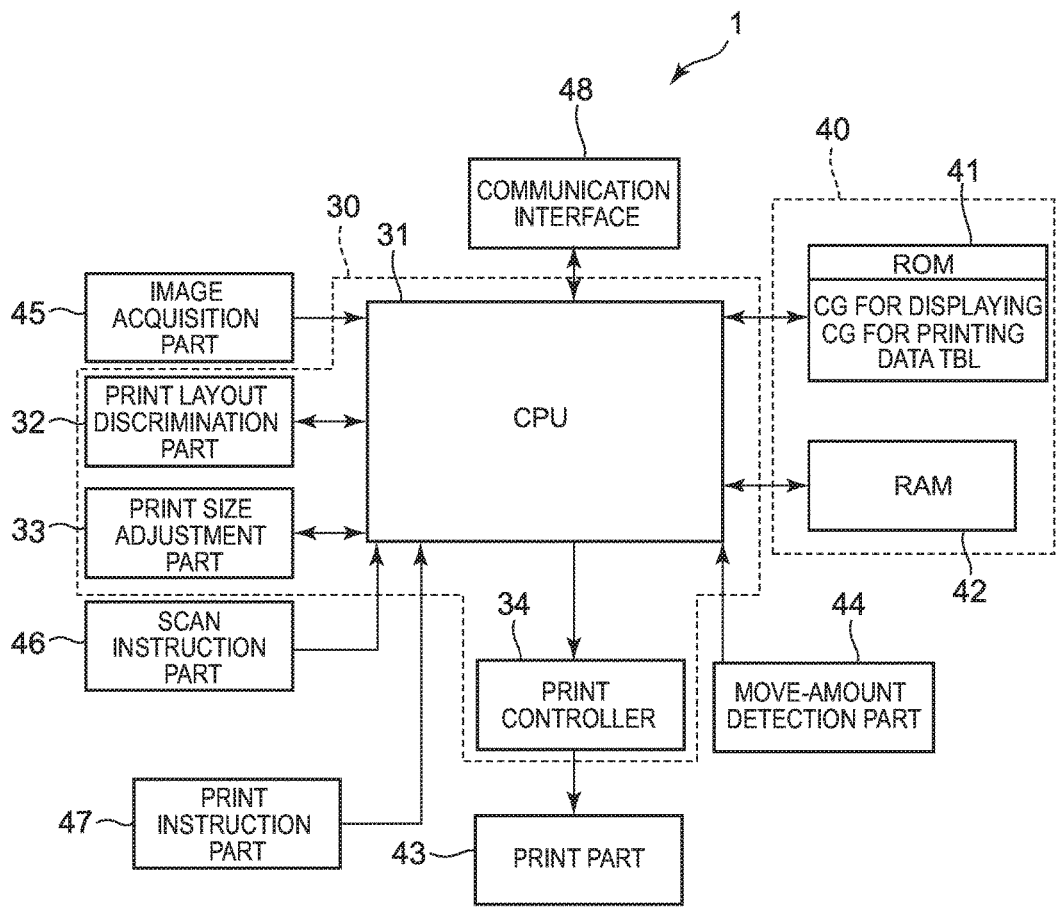
FIG. 2 is a block diagram of the functional configuration of the printer according to one embodiment of the present invention.
FIG. 3 shows a correspondence between the aspect ratio of a frame and the layout pattern in one embodiment of the present invention.

FIG. 2 is a block diagram of the functional configuration of the printer 1 according to one embodiment of the present invention.

The printer 1 is a device (handy printer), with which a user prints data on a material to be printed such as paper while manually moving the printer in a main scanning direction (this may be referred to as a moving direction or a first direction).

As shown in FIGS. 1A and 1B, the printer 1 includes a case 11, a substrate 12, an ink cartridge 13 having a head 14, an optical sensor 15, a line scanner 16, a print start position marker 17, a user interface 18, a scan instruction button 19, a print instruction button 20, a power-source button 21 and a built-in power source 22.

The case 11 is a housing to accommodate the substrate 12, the ink cartridge 13, the optical sensor 15, the line scanner 16, the built-in power source 22 and the like.

The substrate 12 is to mount a CPU 31, a RAM 42, a ROM 41 and the like.

The functions of the CPU 31, the RAM 42, and the ROM 41 are described later.

The ink cartridge 13 is to contain ink, and integrally comes with the head 14, through which ink is discharged to a material to be printed for printing. The ink cartridge 13 is disposed in the printer 1 so that the head 14 is located at a face (in this case, the bottom face) opposed to the material to be printed.

The head 14 has a constant width P in a sub-scanning direction (second direction) orthogonal to the main scanning direction for scanning by a user.

The head 14 therefore can print with the width P in the sub-scanning direction.

The printer 1 may have a removable cap to prevent ink adhering to the head 14 from drying.

The printer 1 may further include a cradle, for example, to hold the printer 1 when it is not used. Such a cradle is an accessory of the printer 1 to prevent ink adhering to the head 14 from drying.

The optical sensor 15 is a move-amount detection part 44 (see FIG. 2) to detect the amount of movement of the printer 1 in the main scanning direction. The optical sensor may be one that is typically used in a mouse for PC that includes a laser or a LED to detect the amount of movement.

The optical sensor 15 of the present embodiment is disposed so that its measurement part to detect the amount of movement is located at the bottom face of the printer 1.

The move-amount detection part 44 is not limited to an optical sensor, which may be of a rotary encoder type.

The line scanner 16 is an image acquisition part 45 (see FIG. 2) to acquire an image on the material to be printed. The line scanner is disposed at the printer 1 so that its part to acquire an image is directed to the bottom face of the printer 1.

The line scanner 16 is disposed forward of the head 14 in the main scanning direction (the direction in which the printer will move) by distance D.

That is, when the printer 1 moves in the main scanning direction, an image on the material to be printed at a part forward of the head 14 in the main scanning direction can be acquired.

As shown in FIG. 1B, the line scanner 16 has the width S in the sub-scanning direction in which an image can be acquired, and the width S is wider than the width P of the head 14 in the sub-scanning direction.

This allows the printer to acquire an image in a region wider than the printable width of the head 14 in the sub-scanning direction, and so allows the printer to acquire an image for correct understanding of a positional relationship of a frame on the material to be printed with the head 14 in the sub-scanning direction.

The print start position marker 17 is disposed at a lower end and outside of the case 11 that is forward of the head 14 in the main scanning direction. The print start position marker serves a mark for a user to place the printer 1 on the material to be printed before printing.

More specifically, a user may place the printer 1 on the material to be printed so that the print start position marker 17 aligns with the position of the material to be printed from which the user wants to start printing, and may move the printer 1 for scanning in the main scanning direction. Then, when the head 14 arrives at the position aligned with the print start position marker 17, the printer starts printing.

The print start position marker 17 includes a light source, such as a LED, to indicate the scanning direction with light for a user. In this way, the print start position marker serves as a guide as well to guide the scanning by the user with the printer 1 in the main scanning direction.

Preferably the width of the print start position marker 17 in the sub-scanning direction is equal to the width P of the head 14 in the sub-scanning direction for correct understanding by a user about the width in the sub-scanning direction in which graphics and characters (letters, symbols, marks and the like) can be printed.

The user interface 18 is an interface with a user, and includes a liquid crystal screen having a touch-panel function serving as an operating part as well.

This liquid crystal screen serves as a display part as well, on which a predetermined message is displayed when the printer is ready for printing as described later or if an error occurs.

The user interface 18 may include a speaker not illustrated. The speaker may output an error message by sound or voice when the printer is ready for printing or if an error occurs.

The user interface 18 includes a wireless unit for communication with an external terminal (e.g., a mobile phone, a smartphone, a tablet terminal, or a personal computer) as in Wi-Fi, or an external connection port through which a removable recording medium, such as a USB memory or a SD card, can be mounted.

The scan instruction button 19 is an operating button to allow a user to instruct various types of processing to the printer 1 to prepare for printing.

The print instruction button 20 is an operating button to allow a user to instruct processing for printing to the printer 1 after the printer becomes ready for printing.

The power-source button 21 is an operating button to allow a user to turn on or off the power source of the printer 1.

The built-in power source 22 is a power source of the printer 1, which may be a dry cell or a secondary battery, for example.

The printer 1 may receive electricity from an external power source not illustrated.

The printer 1 may include other components. For instance, the printer 1 may include a roller or the like for facilitating moving of the printer for scanning in the main scanning direction. The roller may be disposed at the lower end of the case 11 or at the bottom face of the case 11.

[Functional Configuration of Printer]

Referring next to FIG. 2, the following describes the functional configuration of the printer 1.

As shown in FIG. 2, the printer 1 has functional parts, such as a controller 30, a memory 40, a print part 43, the move-amount detection part 44, an image acquisition part 45, a scan instruction part 46, a print instruction part 47, and a communication interface 48.

The move-amount detection part 44 and the image acquisition part 45 include the optical sensor 15 and the line scanner 16 as described above.

The controller 30 is a functional part to control the overall operation of the printer 1, and includes the CPU 31, a print layout discrimination part 32, a print size adjustment part 33 and a print controller 34.

The CPU 31 is a part to perform various calculations. For instance, receiving a print instruction from the print instruction part 47 including the print instruction button 20, the CPU 31 determines the contents to be printed in accordance with various types of data stored in the ROM 41 and the RAM 42, a result of determination by the print layout discrimination part 32, a result of adjustment by the print size adjustment part 33, an image acquired by the image acquisition part 45 and a result of detection by the move-amount detection part 44, and instructs the printing to the print controller 34.

The print layout discrimination part 32 determines (discriminates) a print layout based on information on a frame detected from an image captured by the image acquisition part 45 (line scanner 16) and information (print data) on character strings to be printed, and outputs the print layout to the CPU 31.

The print size adjustment part 33 adjusts the print size based on the print layout determined by the print layout discrimination part 32, the information on the frame, and the print data so that the print data can be within the frame while having a good appearance.

When character strings are to be printed in a plurality of neighboring frames, the print size adjustment part 33 calculates the print size for each character string to be printed in the frame, and applies the smallest print size among the calculated plurality of print sizes to all of the character strings.

The print controller 34 outputs the print data (print buffer) stored in the RAM 42 to the print part 43 described later in accordance with the amount of movement of the printer 1 detected by the move-amount detection part 44, and controls the printing by the print part 43.

The detailed operation of such a controller 30 is described later.

The memory 40 includes the RAM 42 and the ROM 41.

The RAM 42 temporarily stores data used for calculation by the CPU 31 and data to be output to the print part 43.

The ROM 41 stores information on data that are graphics and characters to be printed, including letters, symbols and pictograms, and their sizes. The ROM 41 stores a data table as well (see FIG. 3) on patterns of print layout.

The ROM 41 stores a program as well to implement the functions of the printer 1.

The print part 43 is a functional part to print on a material to be printed. The print part 43 of the present embodiment includes the ink cartridge 13 having the head 14.

The scan instruction part 46 of the present embodiment includes the scan instruction button 19. In response to the operation of the scan instruction button 19 by a user, the scan instruction part 46 instructs detection of a frame during scanning with the printer 1 and preparation for the following printing to the controller 30.

The print instruction part 47 of the present embodiment includes the print instruction button 20. In response to the operation of the print instruction button 20 by a user, the print instruction part 47 instructs printing to the controller 30.

The communication interface 48 is a part of the user interface 18, and is an interface receiving various types of data (e.g., print data (templates)) and various programs from a terminal, such as a personal computer or a smartphone.

Specifically the communication interface may be a wireless unit for Wi-Fi or an external connection port through which a USB memory or the like is mounted.

In this way, the printer 1 can read print data (templates) prepared by a terminal, such as a personal computer.

[Processing Executed by Controller]

Referring to FIGS. 3 to 6, the following describes various types of processing executed by the controller 30.

FIG. 3 shows a correspondence between the aspect ratio of a frame and the layout pattern.

FIGS. 4A-4G illustrate input data and the arrangement of the input data in each layout.

Figure 5A:
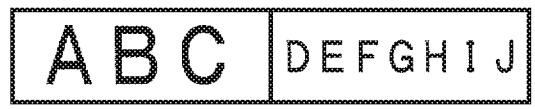
FIGS. 5A and 5B illustrate an example of the adjustment of print size.
Figure 5B:

FIGS. 5A and 5B illustrate an example of the adjustment of print size.

Figure 6A:
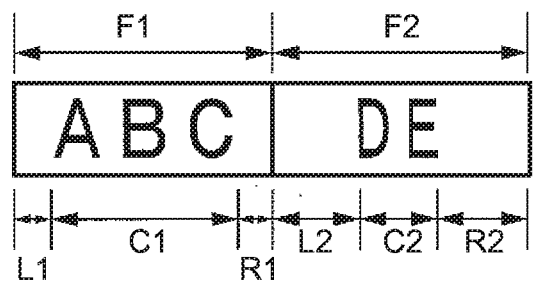
FIGS. 6A and 6B illustrate an example of a method for determining the print position.
Figure 6B:
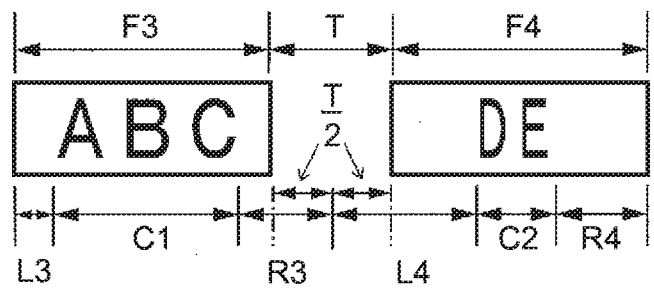

FIGS. 6A and 6B illustrate an example of a method for determining the print position.

The printer 1 detects a frame, prepares for printing based on a result of the frame detection, and performs printing.

Correspondingly the controller 30 executes print preparation processing including frame detection processing, and print processing.

The print preparation processing of the present embodiment, which will be described later in details, include such frame detection processing as well as discrimination processing, size adjustment processing and alignment processing.

The following describes the processing in details. Note that the following describes characters and character strings using letters of alphabet as a specific example of the graphics and characters, and characters and character strings in the description include symbols, marks and the like depending on the contents of print data.

As described above, the printer 1 includes the scan instruction button 19 (scan instruction part 46) and the print instruction button 20 (print instruction part 47). This allows a user to select between instructions to the printer 1 to prepare for printing, such as detection of a frame, and to execute printing.

When the user operates the scan instruction button 19 of the scan instruction part 46 so as to let the printer 1 execute the preparation for printing, the controller 30 first performs frame detection processing. In the frame detection processing, the controller 30 detects a frame without printing during scanning by the user with the printer 1 in the main scanning direction (scanning for frame detection). The detection is performed based on the amount of movement detected by the move-amount detection part 44 (optical sensor 15) and an image acquired by the image acquisition part 45 (line scanner 16).

Specifically, when the user scans an image including a frame with the printer 1, the image of the frame changes in the course of scanning. A frame has a feature that a vertical line (hereinafter also called a first vertical line) in the sub-scanning direction appears at the starting position of the frame, and then a pair of horizontal lines in the main scanning direction continuous to the vertical line (the first vertical line) appears.

Therefore when detecting the feature of a vertical line (first vertical line) followed by a pair of horizontal lines continuous to the vertical line (first vertical line), the controller 30 determines that the position of the vertical line (the first vertical line) is the starting position of the frame to detect the starting position of the frame.

A frame has another feature that another vertical line (hereinafter also called a second vertical line) appears at the end position of the frame in the image of the frame that changes in the course of scanning. The vertical line is continuous to the pair of horizontal lines that remains in the image from the starting position of the frame.

Therefore, following the detection of the starting position of a frame, when detecting the feature of another vertical line (a second vertical line) continuous to the pair of horizontal lines in the image, the controller 30 determines that the position of the vertical line (the second vertical line) is the end position of the frame to detect the end position of the frame.

Since the length of the first vertical line can be obtained based on the acquired image, the controller 30 sets the length of the first vertical line as the width (hereinafter also called a vertical width) of the frame in the sub-scanning direction. Since a distance from the start position to the end position of the frame is detected with the amount of movement detected by the move-amount detection part 44 (optical sensor 15), the controller 30 sets the distance from the start position to the end position of the frame as the width (hereinafter also called a horizontal width) of the frame in the main scanning direction.

In this way, the printer 1 can acquire the vertical width and the horizontal width of the frame.

The controller 30 may use the same algorithm to recognize a plurality of frames that are connected as shown in FIG. 4C and FIG. 4E.

Specifically, also in the second frame, following the second vertical line, the controller detects a pair of horizontal lines continuous to the second vertical line. In this way, when a vertical line (second vertical line) appears first, and then a pair of horizontal lines continuous to the vertical line (second vertical line) appears, the controller determines that the position of the second vertical line is the starting position of the second frame.

That is, when a vertical line appears first and then a pair of horizontal lines continuous to the vertical line appears, the vertical line shows the starting position of the frame. When another vertical line appears to be continuous to the pair of horizontal lines, such a vertical line shows the end position of the frame. This relationship holds also for the case where a lot of frames are connected as in FIG. 4E.

The controller 30 repeats such detection processing of the start position and the end position of a frame until the scanning with the printer 1 ends.

As a result, the controller 30 obtains the number of frames, the vertical width (first width in the sub-scanning direction) and the horizontal width (second width in the main scanning direction) of each frame, and the positional relationship of the frames (e.g., whether the frames are connected or separated or the space between the frames).

The vertical line and the horizontal lines making up a frame may be solid lines or other types of lines, such as dash lines, dotted lines, or dot-dash lines.

Also for dash lines, dotted lines, or dot-dash lines, the above processing can be executed by determining them as lines as long as spaces between the dots or dashes are within a certain length.

After the frame detection processing, the controller 30 (print layout discrimination part 32) calculates the ratio of the horizontal width to the vertical width of the frame (aspect ratio), and performs discrimination processing to discriminate one of a plurality of layouts to be used for printing based on the calculated aspect ratio.

For instance, as shown in FIG. 3, the printer 1 provides a table as a reference including three patterns of a full-text unit layout, a character-string unit layout and a one-letter unit layout. The table is stored in the ROM 41.

A layout suitable for the detected frame is selected from these three patterns of the print layout.

For instance, as shown in FIG. 3, when the aspect ratio of a frame is "1:5 or more", i.e., the horizontal width of the frame is five times or more the vertical width, the controller 30 (print layout discrimination part 32) selects the full-text unit layout for printing of this frame.

The full-text unit layout is for a frame to fill in a name or an address as a whole, for example, and printing is performed so that the total text of print data is within the frame.

That is, when input data of "ABC DEF" (including a space between "ABC" and "DEF") as in FIG. 4A is given to a frame discriminated as the full-text unit layout, the input data as a whole including the space is printed in one frame as shown in FIG. 4B.

As shown in FIG. 3, when the aspect ratio of a frame is "1:2 or more to less than 1:5", the controller 30 (print layout discrimination part 32) selects the character-string unit layout for printing of this frame.

The character-string unit layout is for frames to fill in a family name and a given name separately or to fill in the sections of an address in accordance with the addressing system separately, for example, and printing is performed so that the divided print data is within each corresponding frame.

Specifically when input data of "ABC DEF" (including a space between "ABC" and "DEF") as in FIG. 4A is given to a frame discriminated as the character-string unit layout, the print data is divided into character strings before and after the space, and the divided character strings (the character strings "ABC" and "DEF") are printed in their respective frames as shown in FIG. 4C and FIG. 4D.

As shown in FIG. 3, when the aspect ratio of a frame is "less than 1:2", the controller 30 (print layout discrimination part 32) selects the one-letter unit layout for printing of this frame.

The one-letter unit layout is for a frame to fill in one letter of a name or an address, and printing is performed so that one letter of the print data is in the frame.

Specifically when input data of "ABC DEF" (including a space between "ABC" and "DEF") as in FIG. 4A is given to a frame discriminated as the one-letter unit layout, printing is performed so that the individual letters (including the space) making up the input data are in their respective frames as shown in FIGS. 4E to 4G.

After the above-described discrimination processing, the controller 30 (print size adjustment part 33) performs size adjustment processing for preparation for the printing. In the size adjustment processing, the controller 30 (print size adjustment part 33) adjusts the sizes of graphics and characters to be printed so that the print data is within a frame (frames) in accordance with the discriminated print layout.

When the character-string unit layout is selected in the discrimination processing, the number of characters may be different among the character strings. In this case, if their sizes are adjusted so that the character strings can be within their corresponding frames, the size (font) of the letters after the adjustment may be different among the frames as shown in FIG. 5A.

Printing in such a state has bad appearance. For better appearance, the size (font) of letters is desirably uniform among the frames.

Then the controller 30 (print size adjustment part 33) adjusts the size of letters so that the size (font) of letters is uniform among the frames. If the print size of "DEFGHIJ" is adjusted to be the print size of the letters "ABC" in FIG. 5A, "DEFGHIJ" after adjustment will be beyond the frame. Then, as shown in FIG. 5B, the controller 30 adjusts the print size of letters so that the smallest print size (font) among the print sizes for the frames is applied to all of the character strings.

After such size adjustment processing, the controller 30 performs alignment processing for preparation for printing. In the alignment processing, the controller 30 aligns the print data of the adjusted print size so that it can be centered in the frame.

The alignment processing of the present embodiment is performed as follows, for example, in accordance with the selected print layout.

When the frame is discriminated as the full-text unit layout, the print data is arranged in the frame as shown in FIG. 4B so that the total text of the print data is printed from the offset position by distance L from the start position of the frame.

This distance L, i.e., the offset value L is set as the value of a half of a difference between the horizontal width F and the horizontal width C of the print data "(F−C)/2". This is for printing of the print data in the center of the frame.

Note here that the print data is not necessarily centered, and so the offset value L may be set by default, or may be set by a user.

When printing is actually performed, the controller 30 controls to start the printing from the position displaced by the offset value L from the start position of the frame, and after printing the full text, stops the printing at the position displaced by the offset value R (=F−C−L=L).

For printing as in FIG. 4B, the offset value R is not necessarily required.

This is because the actual printing may end when all of the print data (print buffer) is printed.

When the frame is discriminated as the character-string unit layout, the print data is arranged in the frame so that each character string is centered in the corresponding frame and is printed at the offset position from the start position and the end position of the frame.

The offset value set for the character-string unit layout differs between whether the neighboring frames are connected or separated.

For instance, when the character strings "ABC" and "DE" are printed in two connected frames as in FIG. 6A, the print data is arranged so that the character string "ABC" is printed from the position away from the start position of the first frame by the offset value L1 and the character string "DE" is printed from the position away from the start position of the second frame by the offset value L2.

Then the offset values L1 and R1 are set as the value of a half of a difference between the horizontal width F1 of the frame and the horizontal width C1 of the character string "ABC". The offset values L2 and R2 are set as the value of a half of a difference between the horizontal width F2 of the frame and the horizontal width C2 of the character string "DE".

When printing is actually performed, the controller 30 controls to start the printing of the character string "ABC" at the position displaced by the offset value L1 from the start position of the first frame, and after printing the character string "ABC", controls to start the printing of the character string "DE" at the position displaced by the distance as the total of the offset value R1 and the offset value L2. After printing the character string "DE", the controller 30 controls to stop the printing at the position displaced by the offset value R2 (=F2−C2−L2=L2).

In this case also, instead of stopping the printing after the final moving by the offset value R2, the printing may end when all of the print data (print buffer) is printed.

When the character strings "ABC" and "DE" are printed in two separated frames as in FIG. 6B, the offset value L3 from the start position of each frame is determined similarly to the offset value L1.

The position for printing the character string "DE", however, has to be determined considering the distance T between the first frame and the second frame.

In this case, the offset value R3 after printing of the first character string is set as the value "L3+T/2" that is a value obtained by adding a half of the distance T between the frames to the offset value L3. The offset value L4 before starting the printing of the second character string is set as the value "MO+T/2" that is a value obtained by adding a half of the distance T between the frames to the offset value MO(=(F4−C2)/2) in the frame.

The offset value R4 is (F4−C2)/2.

Note that another way to set the offset values may be used to arrange these letters at predetermined positions, and the above method is not a limiting one.

For instance, the same offset value as that for L3 may be used also for the offset value after the character string "ABC" for the configuration of FIG. 6B similarly to FIG. 6A. After that, the offset value of the distance T may be set. The same offset value as that for the offset value R4 may be used for the offset value before and after the character string "DE" in the frame to print the character string "DE" similarly to FIG. 6A.

Also when the frame is discriminated as the one-letter unit layout as in FIGS. 4E to 4G, the controller 30 performs the alignment processing based on the same idea as that of FIGS. 6A and 6B basically. That is, the character strings are arranged so that each letter is centered in the frame in the main scanning direction.

For instance when the neighboring frames are connected as shown in FIG. 4E, the controller 30 arranges the letters similarly to FIG. 6A.

When the neighboring frames include a space therebetween as shown in FIG. 4F and FIG. 4G, the controller 30 arranges the letters considering the space (distance between the frames) similarly to FIG. 6B.

After the above alignment processing ends, the printer is ready for the actual printing.

When the user operates the print instruction button 20 of the print instruction part 47 so as to select execution of printing, the controller 30 performs print processing by the print part 43 (head 14) in response to the scanning by the user with the printer 1 in the main scanning direction (scanning for printing). The printing is performed so that the print data is within the frame (frames) detected by the frame detection processing based on the result of the alignment processing and the size adjustment processing.

[Operation of Printer]

Figure 7:
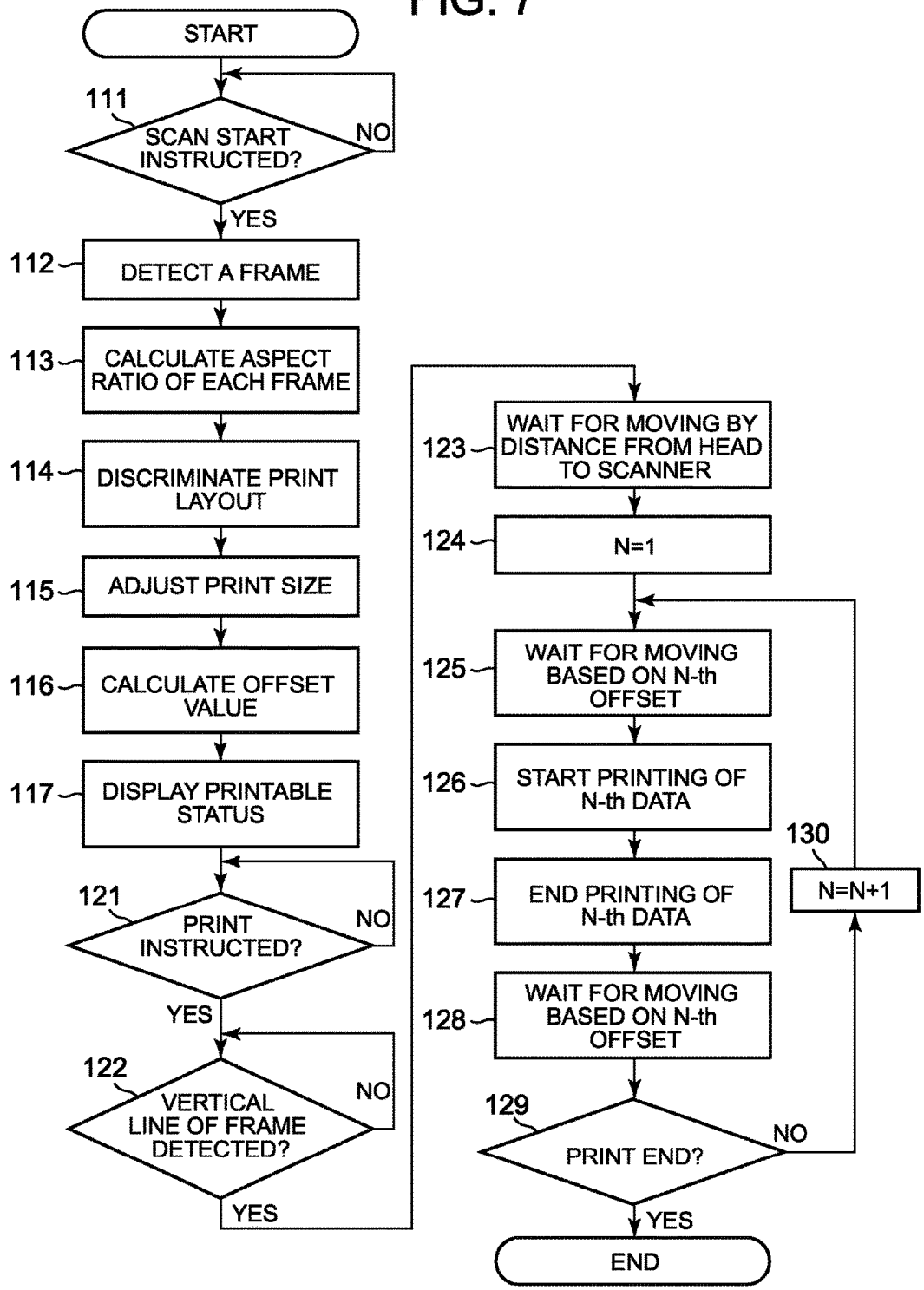
FIG. 7 is a flowchart showing the operation of the printer according to one embodiment of the present invention.

The above describes the basic processing by the printer, and the following describes the operation of the printer 1 again in details, with reference to FIG. 7 and FIG. 8.

FIG. 7 is a flowchart showing the operation of the printer 1.

FIG. 8 illustrates an example of the result of printing.

As is readily understood from the above, the operation of the printer 1 can be divided into the preparation operation during scanning for frame detection and the following print operation during scanning for printing. The following describes these operations one by one.

In the following description, prior to scanning for frame detection, a user prepares print data, or print data transmitted from an external terminal is registered in the printer 1.

(Preparation Operation During Scanning For Frame Detection)

When a user turns on the power-source button 21, the printer 1 is activated. At Step 111, the controller 30 starts loop processing to determine whether the scan instruction button 19 is operated or not until the user operates the scan instruction button 19.

When the user sets the printer 1 at the frame-detection start position and operates the scan instruction button 19, the procedure shifts to the processing of Step 112 or later.

Note here that the frame-detection start position and the print start position may be the same. For instance, the user may align the print start position marker 17 of the printer 1 with the print start position, and then may operate the scan instruction button 19.

At Step 112, the controller 30 (CPU 31) detects a frame from an image acquired by the image acquisition part 45 (line scanner 16).

The frame can be detected by detecting the start position and the end position of the frame as described above.

At this time, the controller 30 acquires the vertical width of the frame from the image, and acquires the horizontal width of the frame based on the detection result of the amount of movement by the move-amount detection part 44 (optical sensor 15).

Step 112 is performed until the detection result of the amount of movement by the move-amount detection part 44 (optical sensor 15) shows starting of the moving of the printer 1 and then shows the stopping of the moving, i.e., until it is determined that the scanning of the printer 1 ends. That is, this step is performed until the scanning ends.

At Step 112, when a plurality of frames is detected, the controller 30 counts the number (N) of the frames, and acquires the vertical width and the horizontal width of each frame.

When the neighboring frames include a space therebetween, the controller 30 acquires the distance between the frames as well based on the detection result by the move-amount detection part 44.

Next, at Step 113, the controller 30 calculates the aspect ratio of each frame detected at the preceding Step 112.

At Step 114, the controller 30 (print layout discrimination part 32) discriminates the type of the detected frame from the "full-text unit layout", "character-string unit layout" and "one-letter unit layout" illustrated in FIG. 3. This discrimination is made based on the aspect ratio calculated at the preceding Step 113 and the patterns (see FIG. 3) of print layout stored in the ROM 41.

At Step 115, the controller 30 (print size adjustment part 33) adjusts the print size so that the print data is within the detected frame (frames).

At this time, when the frames are discriminated as the "character-string unit layout" at the preceding Step 114, the controller 30 adjusts the sizes (fonts) of all of the graphics and characters to be printed to the smallest print size among the print sizes selected for the frames (see FIGS. 5A and 5B).

This can avoid printing of graphics and characters (letters, symbols, marks and the like) of different print sizes (fonts) in these frames, and so they can be printed with good appearance.

At Step 116, the controller 30 calculates the offset values on the right and the left (on the rear and the front in the main scanning direction) of the character string of the print size set at the preceding Step 115 to be printed in the frame. The offset values are calculated so that the print data can be centered in the frame (see FIG. 4B and FIGS. 6A and 6B).

At Step 117, the controller 30 informs the user that the printer is ready for printing through the user interface 18 (e.g., a display part).

In this way, preparation operation during scanning for frame detection ends.

(Print Operation During Scanning For Printing)

In the print operation during scanning for printing, at Step 121, the controller 30 firstly repeats loop processing to determine whether the print instruction button 20 is operated or not until the user operates the print instruction button 20.

When the user sets the printer 1 at the print start position and operates the print instruction button 20, the procedure shifts to the processing of Step 122 or later.

At Step 122, the controller 30 determines whether any vertical line indicating the start position of a frame is detected or not.

When it is determined that no vertical line is detected, the procedure at Step 122 is repeated.

When a vertical line is detected, at Step 123, the controller 30 waits for the printer moving forward by distance D (see FIG. 1B) between the head 14 and the line scanner 16 without printing based on the amount of movement of the printer 1 in the main scanning direction detected by the optical sensor 15 (move-amount detection part 44).

This step is to wait for the scanning to a predetermined position based on the amount of movement, and after Step 123, the head 14 is located at the start position of the frame.

Next, the print processing starts.

First, before executing the processing to the first frame, the controller 30 sets N=1 at Step 124.

N is a natural number indicating the number of frame (frames) detected at Step 112.

For instance, when the frame as in FIG. 4B is detected, the largest number of N is N=1. Similarly for the frames as in FIGS. 4C and 4D, N=2, and for the frames as in FIGS. 4E to 4G, N=7.

Next, at Step 125, the controller 30 waits for the printer moving forward without printing based on the offset value calculated at Step 116, so that the head 14 moves to the print position of the first frame.

Then, the controller 30 controls to start printing of the first data at Step 126. After printing the print data, the controller 30 controls to end the printing of the first data at Step 127.

After that, at Step 128, the controller 30 waits for the printer moving forward without printing based on the offset value calculated at Step 116, so that the head 14 moves to the end position of the first frame.

At Step 129, the controller 30 determines whether data for the next frame is present or not.

When data for the next frame is present, at Step 130, the controller adds 1 to N, and repeats from Step 125 to Step 128.

When all of the print data is printed, a series of the procedure ends.

FIG. 8 shows an example where the printing in accordance with the flowchart of FIG. 7 (the processing from START to END) is performed three times in total. That is, printing is performed in the entry frame for phonetic transcription (see the upper frame in FIG. 8), in the entry frame for name (see the middle frame in FIG. 8), and in the entry frame for address (see the lower frame in FIG. 8).

According to the present embodiment, as shown in FIG. 8, the print form can be changed automatically depending on the format of a frame on the print sheet or the like.

Therefore a user can print data in the frame easily and with good appearance without designating a complicated print format.

When the same character string is printed in different formats, print data of each format is not required.

This can improve the efficiency to manage database and improve the efficiency to search the data.

That is the description of the printer of the present invention by way of specific embodiments, and the present invention is not limited to the above specific embodiments.

For instance, if the number N of the frames detected is not enough to fill in the print data, i.e., when the frame is discriminated as the character-string unit layout as in FIG. 4C and FIG. 4D, and the number of the detected frame is one while the number of character strings to be printed is two, the controller 30 may display warning on the user interface 18 and may stop the operation.

The layout is not limited to the three patterns shown in FIG. 3, and more patterns may be prepared.

In this way, the present invention is not limited to the specific embodiments, and it will be appreciated for a person skilled in the art from the appended claims that the specific embodiments can be modified or improved in various ways, and such modified or improved embodiments fall within the technical scope of the present invention.

What is claimed is:

1. A printer comprising:
    a processor;
    a head configured to perform printing;
    a sensor configured to detect the amount of movement of the printer; and
    a scanner configured to acquire an image including a frame described on a material to be printed beforehand, the scanner being disposed forward of the head in a moving direction of the printer, wherein
    the processor executes
    scanning for frame detection over the material to be printed, frame detection processing to detect the frame based on the amount of movement and the image without performing the printing, and
    scanning for printing over the material to be printed, print processing to perform the printing with the head based on the frame detected.

2. The printer according to claim 1, wherein in the frame detection processing, the processor detects a start position of the frame when a pair of horizontal lines in a first direction along which the printer moves appears following a vertical line in a second direction orthogonal to the first direction, the horizontal lines being continuous to the vertical line, in the image that changes with the scanning for frame detection over the material to be printed, and detects an end position of the frame in the image when another vertical line continuous to the horizontal lines appears following the pair of horizontal lines, and the processor repeats the detection of a start position and an end position of a frame until the scanning for frame detection over the material to be printed ends.

3. The printer according to claim 1, wherein between the frame detection processing and the print processing, the processor performs discrimination processing based on a ratio of a second width of the frame in the first direction to a first width of the frame in the second direction orthogonal to the first direction along which the printer moves, the discrimination being made which one of layouts is to be used for printing, the layouts including: full-text unit layout in which full text of graphics and characters to be printed is arranged within the frame; character-string unit layout in which a character string of the graphics and characters sectioned by a space is arranged within the frame; and one-letter unit layout in which one graphic or character of the graphics and characters is arranged within the frame.

4. The printer according to claim 3, wherein between the discrimination processing and the print processing, the processor performs size adjustment processing to adjust size of the graphics and characters to be printed to a print size such that the graphics and characters are within the frame in accordance with the layout discriminated at the discrimination processing.

5. The printer according to claim 4, wherein, in the size adjustment processing, the processor determines the print size for each frame so that the character string is within the frame, and applies a smallest print size among the print sizes determined for the frames to the graphics and characters of all of the character strings.

6. The printer according to claim 4, wherein, between the size adjustment processing and the print processing, when applying the print size adjusted at the size adjustment processing, the processor performs alignment processing to center the graphics and characters to be printed in the frame.

7. The printer according to claim 6, wherein after the alignment processing, in response to the scanning for printing over the material to be printed, the processor performs the print processing with the head based on a result of the alignment processing and the size adjustment processing.

8. A method for controlling a printer, the printer including: a head configured to perform printing; a sensor configured to detect an amount of movement of the printer in a direction along which the printer moves; and a scanner configured to acquire an image including a frame described on a material to be printed beforehand, the scanner being disposed forward of the head in the moving direction of the printer, comprising:
    a frame detection step of, during scanning for frame detection over the material to be printed, detecting the frame based on the amount of movement detected by the sensor and the image acquired by the scanner without performing the printing, and
    a print step of, scanning for printing over the material to be printed, performing the printing with the head in accordance with the detected frame.

9. A non-transitory recording medium having stored thereon a program for a printer including: a processor; a head configured to perform printing; a sensor configured to detect the amount of movement of the printer in a direction along which the printer moves; and a scanner configured to acquire an image including a frame described on a material to be printed beforehand, the scanner being disposed forward of the head in the moving direction of the printer, the program making the processor execute at least the steps of:
    a frame detection step of, during scanning for frame detection over the material to be printed, detecting the frame based on the amount of movement detected by the sensor and the image acquired by the scanner without performing the printing, and
    a print step of, scanning for printing over the material to be printed, performing the printing with the head in accordance with the detected frame.

* * * * *